(12) United States Patent
Giacotto

(10) Patent No.: US 9,864,061 B2
(45) Date of Patent: Jan. 9, 2018

(54) STABILIZED DISTANCE MEASUREMENT IN THE OBSERVATION DEVICE

(71) Applicant: Safran Vectronix AG, Heerburgg (CH)

(72) Inventor: Luca Giacotto, Au (CH)

(73) Assignee: Safran Vectronix AG, Heerbrugg (CH)

( * ) Notice: Subject to any disclaimer, the term of this patent is extended or adjusted under 35 U.S.C. 154(b) by 491 days.

(21) Appl. No.: 14/472,168

(22) Filed: Aug. 28, 2014

(65) Prior Publication Data
US 2015/0062557 A1    Mar. 5, 2015

(30) Foreign Application Priority Data
Aug. 28, 2013   (EP) .................................... 13182074

(51) Int. Cl.
| | | |
|---|---|---|
| *G01S 17/10* | (2006.01) | |
| *G01S 17/02* | (2006.01) | |
| *F41G 3/06* | (2006.01) | |
| *F41G 3/02* | (2006.01) | |
| *G01S 7/484* | (2006.01) | |
| *G01S 7/497* | (2006.01) | |
| *G01C 15/00* | (2006.01) | |

(52) U.S. Cl.
CPC ................ *G01S 17/10* (2013.01); *F41G 3/02* (2013.01); *F41G 3/06* (2013.01); *G01C 15/002* (2013.01); *G01S 7/484* (2013.01); *G01S 7/497* (2013.01); *G01S 17/023* (2013.01)

(58) Field of Classification Search
CPC ........ G01S 17/023; G01S 17/89; G01S 17/10; F41G 3/165; F41G 3/06
See application file for complete search history.

(56) References Cited

U.S. PATENT DOCUMENTS

| | | |
|---|---|---|
| 6,023,322 A | 2/2000 | Bamberger |
| 2004/0046953 A1 | 3/2004 | Nagata et al. |
| | (Continued) | |

FOREIGN PATENT DOCUMENTS

| | | |
|---|---|---|
| EP | 1 744 196 A1 | 1/2007 |
| FR | 2 921 149 A1 | 3/2009 |
| | (Continued) | |

OTHER PUBLICATIONS

European Search Report issued on Dec. 2, 2013 in EP Application No. 13 18 2074.

*Primary Examiner* — Luke D Ratcliffe
(74) *Attorney, Agent, or Firm* — Muncy, Geissler, Olds & Lowe, P.C.

(57) ABSTRACT

The invention relates to a portable observation device having an observation path for optical targeting of a target object, and comprising an optoelectronic rangefinder for measuring the distance in the direction of the targeting. The rangefinder includes a transmission unit for emitting a temporal sequence of pulses of optical radiation, a reception unit for receiving a portion of the optical radiation cast back by the target object and for determining signal information and an electronic evaluation unit, which a distance to the target object can be determined on the basis of a signal travel time between emission and reception of the optical radiation. When a trigger is actuated manually, the distance is determined including the signal information from a specified minimum number of pulses, which define a minimum length of a time window of the distance measurement.

20 Claims, 7 Drawing Sheets

(56) References Cited

U.S. PATENT DOCUMENTS

| | | | |
|---|---|---|---|
| 2005/0057745 A1* | 3/2005 | Bontje | G01C 15/002 |
| | | | 356/139.03 |
| 2010/0182426 A1 | 7/2010 | Perruchot et al. | |
| 2013/0182238 A1* | 7/2013 | Berthault | G01S 17/023 |
| | | | 356/4.01 |

FOREIGN PATENT DOCUMENTS

| | | |
|---|---|---|
| FR | 2 965 935 A1 | 4/2012 |
| WO | 2006063740 A1 | 6/2006 |
| WO | 2007022927 A1 | 3/2007 |
| WO | 2012045802 A1 | 4/2012 |

* cited by examiner

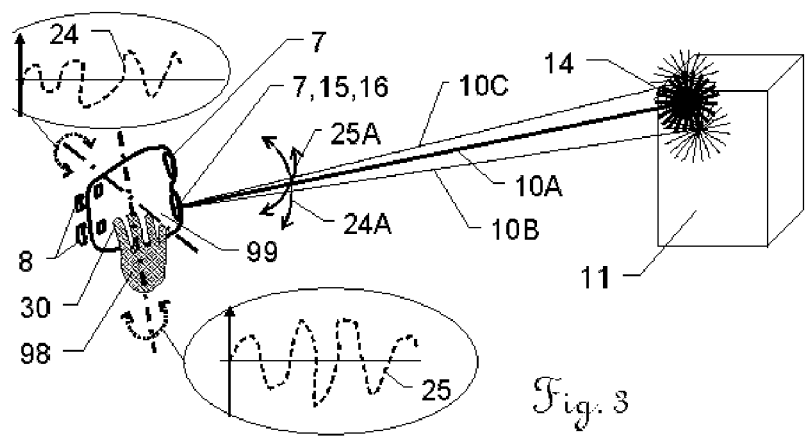
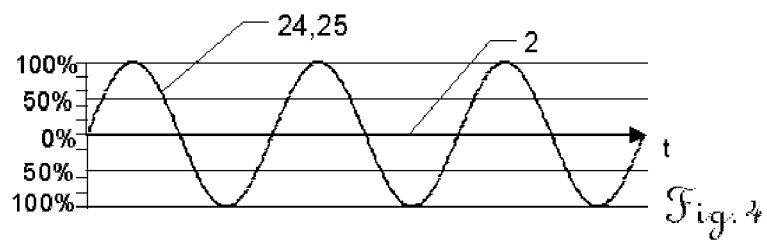
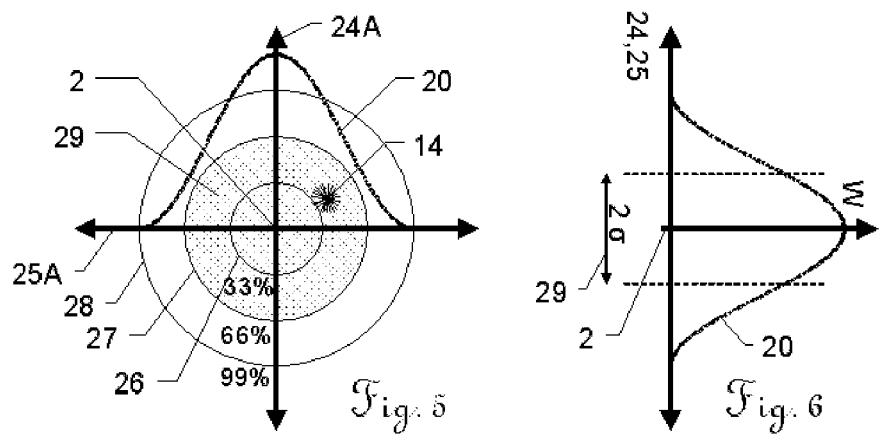

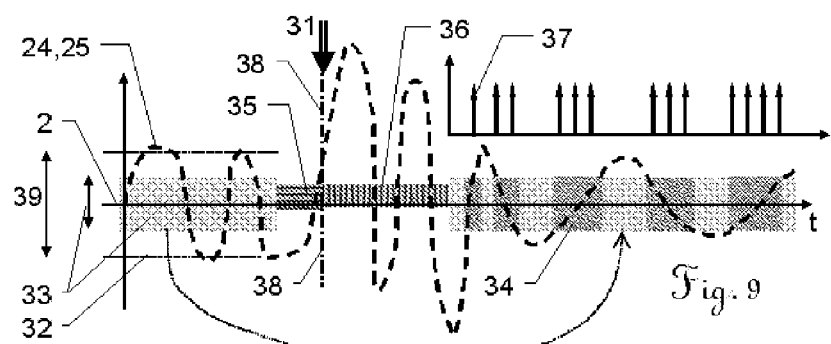
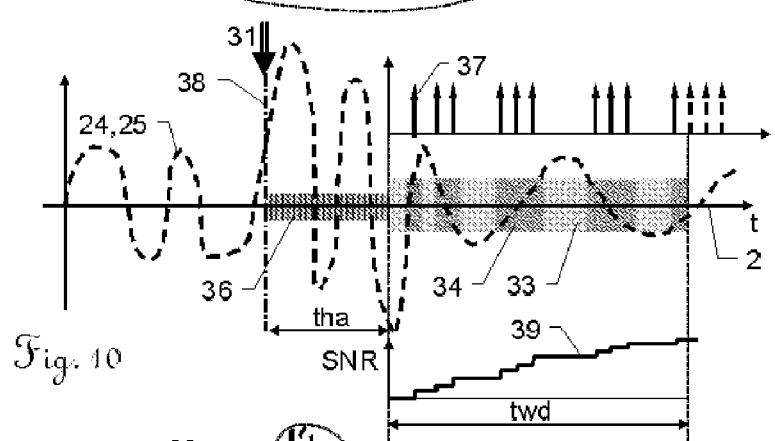
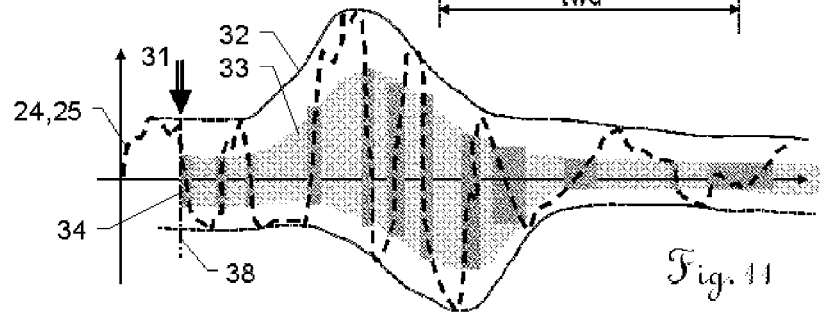

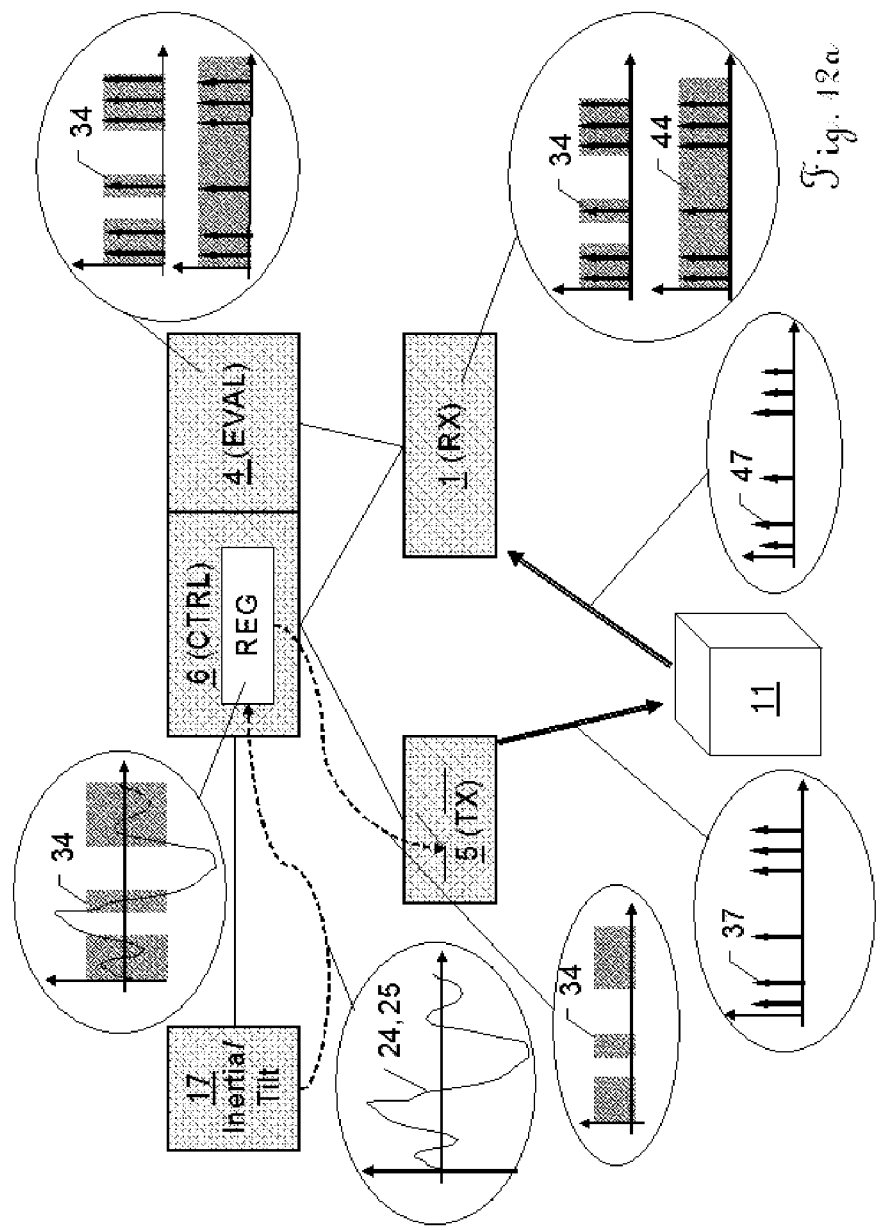

STABILIZED DISTANCE MEASUREMENT IN THE OBSERVATION DEVICE

CROSS REFERENCE TO RELATED APPLICATION

This application claims priority to European Patent Application No.: 13182074.8, which was filed in Europe on Aug. 28, 2013, and which is herein incorporated by reference in its entirety.

BACKGROUND

The invention relates to an observation device comprising a rangefinder, according to the preamble of Claim 1 and to a distance measuring method for an observation device, according to the preamble of Claim 11.

Such observation devices have diverse fields of application, for example in hunting, for landmark navigation on land or at sea, for aiming at objects, for acquiring and documenting geographic surroundings, as information device for hikers, etc. In addition to such civilian fields of application, such devices are also used in the military sector for navigation, observation, etc. Here, it is important for the device to be robust, convenient, operable in a quick and simple manner, and as compact and as light as possible.

The observation devices within the scope of the present invention are robust devices designed for use in the field. These devices are not highly precise and correspondingly sensitive geodetic surveying devices such as tachymeters or theodolites with measurement resolutions in the millimeter range or with higher measurement resolutions, which are used e.g. in the construction sector. The devices described here usually have measurement resolutions of the order of meters or, at best, decimeters, but have measurement ranges of several kilometers, for example of up to five or thirty kilometers or more. The observation devices are primarily provided for hand-held use by persons, i.e., for example, as field glasses or binoculars, monocular telescopes, spotting scopes, portable weapon systems, etc., but can by all means be assembled on a tripod or the like if necessary.

The observation devices treated here can, in particular, comprise an optical transmitted light channel—that is to say, be conventional optical devices in terms of the basic function thereof, in which optical radiation is directed directly from the observed target object into the eye of the observer. However, in other embodiments, these can also be observation devices in which an observation image is recorded using a camera, the image is converted into electrical signals and the electrical signals are reproduced for the observer on a screen display. Here, especially in the case of the devices with a screen, the observation through an eyepiece, through which the recorded observation image can be observed, can be brought about in the conventional manner. Here, the observation path can by all means comprise optical elements for beam shaping, beam deflection, mirroring information in and out, amplifying residual light, etc. Specifically, this can relate to hand-held observation devices or distance-measuring observation devices which are generically embodied for use as a hand-held device, for example by appropriate handles, shaping, etc.

Here, the optical targeting using the observation device also determines the direction of the distance measurement. Here, the point to be measured is targeted by means of an optical apparatus of the transmitted light channel, for example by means of crosshairs in the observation apparatus of the device. In the case of electro-optical distance meters or rangefinders (EDM), an optical signal, for example as optical radiation in the form of laser light pulses, is emitted by the device in the direction of the target object, the distance of which is intended to be determined. If visible light is used in the process, the point on the target object targeted for measuring purposes can be identified visually in the case of appropriate light conditions. However, non-visible wavelengths, e.g. in the infrared range, are often used and the point on the target object targeted for measuring purposes is determined for the user purely by targeting with the observation channel of the device.

The surface of the target object casts back at least a portion of the emitted optical signal, usually in the form of a diffuse reflection. In the device, the cast-back optical radiation is converted into an electrical reception signal by a photosensitive detector element. The distance between the device and the target object can be determined with knowledge of the propagation speed of the optical signal and on the basis of the determined travel time between emission and reception of the signal (i.e. the travel time which light requires for covering the distance from the device to the target object and back again). Here, there usually are one or more optical components for beam shaping, deflection, filtering, etc.—such as lens elements, wavelength filters, mirrors, etc.—in the optical transmission or reception path. Here, transmission and reception can be brought about coaxially using a single optical unit or separately using two separated optical units (e.g. arranged next one another). Here, the distance meter or the rangefinder is integrated in the observation device.

In order to compensate influences which could falsify the measurement results (e.g. temperature influences, component tolerances, drifts of electronic components, etc.), part of the emitted optical signal can be guided as a reference signal over a reference path of a known length from the light source to a light-sensitive reception element. Here, the reference path can be fixedly installed in the device or, for example, be embodied as an optical deflection element that can be pivoted in or plugged on. The reception signal resulting from this reference signal can be received by the photosensitive element used for the target distance measurement or by a further photosensitive element provided especially for the reference signal. The resultant electrical reference signal can be used for referencing and/or calibrating the determined distance measurement values.

In order to obtain a correspondingly high accuracy of the distance measurement, the demands placed on the temporal resolution capabilities of the electro-optical distance meter (EDM) are relatively high due to the high propagation speed of optical radiation. By way of example, for a distance resolution of 1 m, a time resolution with an accuracy of approximately 6.6 nanoseconds is required.

The measurement requires sufficiently strong signal intensities, which can be detected by the receiver, of the returning reception signal. However, the signal power that can be emitted of the transmission signal of the optoelectronic EDM considered here is restricted by physical and regulatory limits. Therefore, work is often undertaken with pulsed operation. Thus, the intensity amplitude of the emitted optical signal is modulated in a pulse-like manner. Temporally short pulses with a high peak power are emitted, followed by pauses during which no light is emitted. Hence, the cast-back component of the pulses has a sufficiently high intensity to allow these to be evaluated from background disturbances and noise, in particular even in the presence of background light (sunlight, artificial illumination, etc.).

In the case of observation devices with rangefinders, ranges from several meters up to many kilometers, for example from 5 m to 20 km or 30 km, are required in this case, and this is required with a measurement accuracy of several meters or even higher measurement accuracy, for example of ±5 m or ±1 m or less. Since, in general, the measurement target does not have special reflective target markers for the measurement (as is conventional in measurement rods, measurement prisms etc. used in surveying), the applied optical distance measurement signal must be embodied and set in the device design in such a way that a distance measurement is possible over the whole specified measurement range (or the range must be specified on the basis of the possibilities of the used signal). Since only a small portion of the emitted radiation returns to the receiver in the case of natural or non-cooperative targets, the signal information from a plurality of pulses is used cumulatively (in particular in-phase) for the evaluation. In the process, the signal-to-noise ratio (SNR) is improved in order thereby also to enable measurements in disadvantageous conditions. By using a plurality of measurement light pulses on the same target point, disturbance signals are removed by averaging and the used signal is amplified, corresponding to a theoretical SNR improvement of approximately the square root of the number of accumulated pulses.

In order to determine the travel time of the signal, the so-called time of flight (TOF) process is known on the one hand, which determines the time between the emission and reception of a light pulse, with the time measurement being performed on the basis of the flank, the peak value or another characteristic of the pulse shape. Here, the pulse shape should be understood to mean a temporal light intensity profile of the reception signal, specifically of the received light pulse—acquired by the photosensitive element. The transmission time can be determined on the basis of an electrical pulse for triggering the emission, on the basis of the actuation signal applied to the transmitter or on the basis of an aforementioned reference signal.

Alternatively, the so-called phase measurement principle is also known, which determines the signal travel time by comparing the phase angle of the amplitude modulation of the emitted and received signals. However, in this case, the measurement result at a transmission frequency has ambiguities in units of the transmission frequency period duration, and so further measures are required for resolving these ambiguities. By way of example, WO 2006/063740 discloses measuring using a plurality of signal frequencies resulting in different uniqueness ranges, as a result of which incorrect solutions can be excluded. WO 2007/022927 also treats uniquenesses in the phase measurement.

In a typical use scenario, the user targets a desired target using the observation device and then triggers the distance measuring process, for example by actuating a trigger button or the like. Thereupon, the measurement result, or further in-depth information derived therefrom, such as coordinates, etc., is displayed to said user, preferably directly by means of the observation channel of the observation device.

The observation device can be equipped with means for determining geographic coordinates, such as a GPS, a constellation identifier, a direction measuring unit, a compass unit, tilt sensors or accelerometers, a night vision function, etc. Using an electronic display for providing information, it is possible, for example, to provide to the user in the transmitted light channel an image from a camera, location information, for example in the form of a map, measured distances or directions, stored information in respect of a sighted target object, temperature and weather information using the electronic display. Depending on field of application and demands on the respective measurement situation, the observation device may, in a modified embodiment, be equipped with e.g. a night vision module, etc. In this context, EP 1 744 196 proposes, in an exemplary manner, several different embodiments for a generic observation device, for example for target marking, for military applications or for hunting purposes.

In the case of a hand-held observation, instabilities and movements of the device as a result of being held in the hand are to be expected in this case, especially in the form of oscillations or oscillation-like movements as a result of trembling, swaying or twitching of the user. This has a clear visible effect, particularly in the case of faraway targets and high magnifications. In the case of distances of the order of kilometers, small changes in angle of the targeting direction already cause lateral displacements of the observed target in the image plane corresponding to several meters. Therefore, continuous, exact targeting of a comparatively small and faraway target is often difficult for the user using a hand-held observation device and requires great concentration and body control. Similar variations in the spatial position of the device can also occur when using the device on an unstable base, such as a land vehicle, aircraft or water vehicle, or when the ground shakes.

As a result of the movements of the observation device, the distance measurement with inclusion of a plurality of measurement light pulses is no longer directed on the same target point, but on a multiplicity of different points which, at least in part, may have varying distances. Therefore, in such a case, the application of a combination of information from a plurality of pulses for determining the distance only brings about a slight improvement in the SNR compared to what is promised from the superposition of information from a plurality of pulses in the theory. This deteriorated SNR can lead to relatively large measurement uncertainties, relatively large measurement errors or even to a failure of the measurement. Further lengthening of the measurement duration for emitting further pulses for improving the SNR, firstly, is undesirable and, secondly, only has limited efficiency due to the further target point deviations occurring thereby.

In the prior art, active dampening or prevention of movements by using a rod or tripod for supporting the device are applied for avoiding trembling movements as a result of being held by hand. However, such additional outlay for setting up the device is undesirable, in particular in view of the primary design as hand-held device.

Mechanical movements of optical elements in the device interior are another known solution for actively stabilizing the direction of observation devices; however, it is usually complicated in terms of the realization thereof, reduces the robustness of the device and makes the device larger and heavier. Moreover, such active stabilizations need to be supplied with power.

The field of digital photo and video equipment has also disclosed digital stabilization of an observation image from a hand-held device using a purely screen-based observation. Although such a digital image stabilization can optionally also be present in the observation devices of the present invention, it is then functionally separated from the approach according to the invention which makes do without image processing or information obtained therefrom. Thus, the stabilization of the distance measurement according to the invention is not dependent on information generated by digital image processing.

Electronic components required for digital stabilization use up e.g. additional power and reduce the robustness in rough usage surroundings, for example by the restricted operational temperature ranges of LC displays and CCD cameras. Restricted optical dynamic ranges of these elements and the high computational complexity for digital processing of image information are further undesirable side effects of such solutions. By contrast, a special embodiment of an observation device according to the invention, with an optical transmitted light channel can continue to meet the basic functionality thereof—a magnified observation of distant objects—even without electrical energy, for example in the case of a defect or empty battery, e.g. in the case of long-term use, and is not only degraded to useless high-tech ballast. Moreover, in such embodiments, the expected battery life is significantly increased.

Document FR 2 921 149 describes a digital device from telemetry, comprising a camera recording unit and an electronic display for displaying the recorded image. In order to depict for the user a clear observation image despite the movements as a result of being held by hand, the recorded camera image is numerically stabilized before being displayed. Since information about the actual current target direction is lost during this stabilization, the latter is additionally also displayed in the stabilized image on the display. Here, a distance to a target object is measured in two steps. Firstly, the desired target is targeted using crosshairs in the stabilized image on the display, which is confirmed by triggering a measurement query. However, the distance measurement is not triggered directly in this case with the actuation of the triggering. First of all, the user must attempt in a second step to bring the current target direction of the distance measurement, depicted in the display, into sufficient correspondence with the crosshairs in the stabilized image by moving the alignment of the observation device. If the device determines the correspondence, it now emits a single light pulse for measuring the distance at this later time, on the basis of which the distance to the target in the crosshairs of the stabilized image is determined. Here, the above-described system merely solves the problem of an unknown target direction of the image-based, image stabilized distance measuring observation device, which problem was newly introduced with the image stabilization. In addition to the previously mentioned disadvantages of fully electronic observations and digital image processing of image stabilizations, etc., this system comprises. Moreover, the system from FR 2 921 149 is based on an individual pulse measurement, in which signal information from a plurality of pulses are not combined to form a measured value, and so, instead, the target can only either be hit or missed.

FR 2 965 935 likewise discloses an observation device with indirect, camera-based observation with a digital stabilized observation image, in which there is an accumulation of a plurality of laser pulses for determining the distance. Here, a sequence of light pulses is emitted when the measurement is triggered. The returned echoes are linked to measurement data from a gyroscope measurement of the current trembling movements—as directional deviation in relation to the target direction of the stabilized display image. The echoes are assigned to corresponding zones in the target region on the basis of this angular deviation. The measured values from the zone in which the best SNR value is obtained are used for determining the distance, which is presented to the user.

SUMMARY

It is an object of the present invention to improve an observation device with optoelectronic rangefinder for measuring the distance to a targeted target object, in particular of a hand-held observation device, e.g. with an optical transmitted light path for observation and targeting.

Specifically, an object here lies in obtaining a reliable distance measurement to the target object targeted with the transmitted light channel, even if the spatial position of the device is unstable during the measurement, i.e. even if the targeting occasionally misses the target object during a time window of determining the distance.

In particular, it is an object to improve the attainable accuracy of the distance measurement during the observation or to extend the distance range in which a reliable distance measurement is possible, even if the device is held in the hand.

Here, a special object lies in obtaining a stabilization independently of instabilities of the device spatial position in the direction of the distance measurement without, in the process, using movable components in the device.

According to the invention, this is a portable observation device with an observation path for optical targeting of a target object, in particular an unstabilized observation path, specifically with an optical transmitted light path from an objective to an eyepiece. The device is equipped with an optoelectronic rangefinder for measuring the distance in the direction of the targeting. The rangefinder comprises a transmission unit for emitting a temporal sequence of pulses of optical radiation, a reception unit for receiving a portion of the optical radiation cast back by the target object and for determining signal information of the cast-back portion of an emitted pulse, and an electronic evaluation unit, which is embodied in such a way that a distance to the target object can be determined on the basis of a signal travel time between emission and reception of the optical radiation.

Here, the distance is determined including the signal information from a specified minimum number of pulses, which minimum number defines a minimum length of a time window of the distance measurement. The device comprises a trigger which can be actuated manually and the actuation of which causes a start of the time window of the distance measurement.

The observation device according to the invention also comprises a movement sensor for acquiring an instability of a spatial position of the observation device and an actuation unit of the rangefinder. Here, the actuation unit is embodied in such a way that the rangefinder is controlled on the basis of spatial position data determined from the movement sensor in such a way that the pulses counting as part of the minimum number satisfy predetermined criteria in respect of these spatial position data assigned in time.

Here, the rangefinder is, in particular a laser distance meter with a collimated laser beam as a target axis.

The invention is based on the discovery that, despite instabilities in the spatial position, for example as a result of trembling or tremor movements of the user, the targeting on average is nevertheless relatively precise. The user is also able to sufficiently well identify the sighted target throughout, despite instabilities, and so complicated stabilization of the eyepiece image is by all means convenient but not mandatory for fulfilling the object addressed by the device. If holding the device by hand in the field causes disturbing movements which are too large to undertake reliable observing and/or targeting, a stable support, a rod or a tripod is usually resorted to in any case, in order to reduce or remove the actual cause of the problem.

Therefore, the unstable observation image provides less difficulty in practice. Rather, deviations caused by tremors, which are usually reflected as oscillations, in particular irregular oscillations, about a mean value of the actual targeting, lead to disadvantages in the distance measurement. Here, there can be erroneous measurements by incorrect sighting and deviations in the direction of the optical pulses from the actually desired target object, particularly in the region of the peak values of the oscillation amplitudes. Therefore, without further intervention, part of the pulse information included in the measurement cannot originate from the actual target object at all. By way of example, in the case of partly missing the target during the distance measurement, caused by instabilities, the pulse information may originate from a different object than the actual target object or not contain any target information at all or only introduce additional noise. This adversely affects the signal quality of the established information to be evaluated for the distance measurement, leading to inaccurate or incorrect measured values or longer measurement times. By way of example, light pulses, which pass the target object in terms of their direction and are therefore not cast back or light pulses which are cast back by a different object in the foreground or background do not contribute as envisaged in a multi-pulse measurement according to the invention for improving the SNR (as a characteristic value of the signal quality of the information used for determining the distance) by increasing the signal term, but smear out the shape of the reception signal and/or rather increase the noise term and can therefore even have negative effects on determining the distance.

Therefore, the proposals for digitally stabilizing the image from the prior art are not directly expedient for solving the actual problem. Said proposals do not solve the actual problem in the distance measurement due to unstable holding by hand, but merely increase the observation convenience using digital image stabilization. However, at the same time, this stabilization harbors new problems. One such new problem caused by the stabilization in this case lies in the concealment of the actual current target direction of the distance measurement. Moreover, the much-publicized electronic image stabilization also entails the aforementioned disadvantages of the electronic observation required in the implementation thereof and of the electronic device components required in this case, which are undesirable, in particular in the case of devices for military or comparable uses.

By way of example, the present invention can also be applied for improving a conventional transmitted light observation device with distance measuring functionality; it can also be applied to a device without digital image processing of the observation image, i.e., for example, in the case of energy-saving, robust observation devices for a rough use in the field. According to the invention, the actually sought-after improvement here in the distance measurement—that is to say e.g. an increase in the measurement accuracy, a reduction in the measurement times, an increase in the distance measurement range that can be covered by the device and/or enabling measurements under adverse conditions, etc.—becomes more robust, simpler and is approached with less technical complexity.

Broadly speaking, the peaks or outliers of the oscillation of an unstable device position are, according to the invention, avoided during the measurement time window by virtue of information during times in which the oscillation lies outside of an acceptable range not being determined and/or not being included for determining the distance.

It is necessary to include a plurality of cast-back light pulses for determining the distance, since, especially in the case of the demanded large distances to natural targets, which are to be determined using the observation device according to the invention, and under the boundary conditions such as eye safety of the measurement radiation, restricted emission power, etc. The signal information from a single cast-back pulse only suffices in the rarest of cases, especially in the case of near and highly reflective targets, to be able to determine a distance with sufficient accuracy and reliability, but the spatial position deviation has a stronger effect with increasing distance. As a result of the minimum number of pulses required according to the invention, determining the distance by all means extends over a time window—even if the individual pulses have a short time duration (for example in the range of microseconds or nanoseconds)—which is significantly longer than a single pulse and by all means can take up to a few seconds. Therefore, no time window is defined during the distance measurement in the case of single pulse measurements, but rather the target is either hit or missed in the case of a measurement with a single pulse—as a result of which there is a completely different problem and effect on the measurement result and which is why approaches from individual pulse measurements are not directly applicable to a device according to the invention. In accordance with the present invention, the distance is determined by accumulating the signal information from the individual pulses returning from the target object, wherein, according to the invention, signals without or with potentially incorrect distance information content are avoided.

Here, in particular, the minimum number is greater than 1 such that this is a so-called multi-pulse measurement; in particular, the minimum number is e.g. greater than 50 or 100 pulses, in particular of the order of thousands of pulses e.g. up to 30 000 or 50 000 pulses or even more. In the observation device according to the invention, the minimum number can be predetermined as a fixed number in this case. The minimum number can also be determined dynamically depending on a signal quality of the reception, for example wherein the minimum number is defined as that number of pulses at which a minimum SNR limit value is reached when determining the distance. It is also possible to apply a combination of a predetermined minimum number and reaching a predetermined signal quality. Additionally, it is also possible to specify a defined maximum number of pulses or a defined maximum duration of the time window.

Here, the movement sensor can be designed in the form of an IMU, by means of which a spatial position or a spatial position deviation of the observation device can be detected, preferably in two directions at least approximately orthogonal to one another, such that horizontal and vertical instabilities of the targeting can be acquired or derived. By way of example, one or more gyroscopes, accelerometers, tilt sensors or a combination of these can be applied in this case, especially in a compact MEMS design. By way of example, a gyroscope can register horizontal instabilities of the direction of the target axis and/or use can be made of one or more horizontally and vertically evaluated accelerometers. Here, a differential evaluation of accelerometers can also be included for the determination. By way of example use can be made of respectively one accelerometer arranged in the region of the eyepiece and one in the region of the objective approximately diagonally opposite thereto. However, it is also possible to use at least two gyroscopes or a multi-axis gyroscope, for example. The axis of rotation or pivoting or trembling of the instability is generally not known per se or else it varies. What is of primary importance according to the invention is determining the instability in relation to the zero or origin of the distance measurement, specifically the horizontal or vertical angular deviation of the target axis of the rangefinder or of the targeting, that is to say an acquisition of one or more physical variables from which these can be derived.

Thus, the data of the spatial position or the spatial position data of the movement sensor represent the spatial position of the observation device and hence that of the direction of the targeting or the direction in which the distance measurement takes place. Here, absolute spatial position information is not mandatory for the evaluation according to the invention, but rather a temporal deviation of the spatial position or of the changing portion of the instability of the spatial position can be included, which can however e.g. also be integrated accordingly.

By way of example, the observation device can register the instability in the form of an oscillation in a spatial direction of the targeting. Here, an oscillation in particular is determined by instabilities or trembling movements or tremors of a hand holding the observation device. Here, the oscillation can be derived for example by an output signal from the movement sensor, acquired in an analog or digital manner, especially of the changing portion in a defined frequency range in which instabilities of targeting by hand usually occur, that is to say e.g. in a range from 0.5 Hz to 20 Hz, especially from approximately 2 Hz to 10 Hz. Since a deviation of the targeting by the instabilities can substantially be described by deviations in two mutually orthogonal spatial directions (e.g. horizontal swaying and vertical swaying of the target axis of the device), the instability is, in particular, determined in at least two spatial directions, preferably at least approximately vertically and horizontally or as a vector in the horizontal-vertical plane.

Here, the control can be brought about on the basis of a criterion, according to which, in order to include the signal information, a current oscillation value assigned thereto in time lies in a predetermined range about a central region of the oscillation.

Here, the criterion can be an assigned movement data sensor value or a variable derived therefrom, which is situated in a predetermined range. Here, the criterion can be fixed, predeterminable by the user or adapt dynamically to the conditions of the current measurement, for example by virtue of an admissible range being determined on the basis of a mean value and/or an average or maximum deviation of the spatial position data over a predetermined time interval. Here, the criterion can also include further influences, such as possible dead times, waiting times, transient processes, etc.

Here, the central region is that region which is intended to be registered by the targeting, i.e. a defined intended region or a defined intended axis of the targeting or the distance measurement to the target object. Here, the central region is defined by the manual triggering of the distance measurement, wherein it is possible not necessarily to include the spatial position precisely present at the trigger time, but also a value or a mean value before or after triggering. This is of particular interest since manual pressing of an operating button on the observation device can usually be linked to a certain short-term tremor and hence to change in the spatial position of the observation device, which would lead to undesired deviations of the targeting of the central region.

By way of example, the central region of the oscillation can be determined a mean value of the movement over a defined period of time before or after a time at which the trigger is actuated. Thus, actuating the trigger does not necessarily instantaneously trigger the start of the time window of the distance measurement, but it can also cause the start of the time window with a time delay, for example after a waiting time during which possible device movements caused by the actuation have decayed, which can, for example, be predetermined by a defined waiting time or be on the basis of the data from the movement sensor.

Thus, in order to determine the central region, it is possible to average spatial position data of the movement sensor over a time interval prior to triggering since a mean value of the instabilities of the targeting generally substantially corresponds to the desired targeting. In this context, a mean value should be understood not only to mean a linearly formed mean value from spatial position data acquired over the time interval, it is also possible e.g. to apply a root mean square value or a statistical characteristic, a low pass filter, etc. of the movement sensor data belonging to the central regions of the targeting.

Since actuating the trigger, for example by pressing down with the finger of the holding hand, often is a trigger for additional instabilities in the spatial position of the observation device, the mean value can be formed before or after a time interval of triggering. In order, in the case of determining the mean value before triggering, not to have to determine the mean value in a continuous preemptive manner, forming the mean value can be caused by e.g. tapping the trigger before the actual actuation of the trigger.

The predetermined range about the central region of the oscillation can be set with dynamic or statistical dependence on an amplitude of the oscillation. By way of example, a percentage, which can be set by the user, of a maximum value of the amplitude of the oscillation over a defined time interval can be defined as range about the central region, in which pulses count as part of the minimum number, or a predetermined percentage of a mean value or a statistical characteristic (such as standard deviation, . . . ) of the amplitude of the oscillation can be applied for static or dynamic setting of the range about the central region.

In order to set the minimum number of pulses included in determining the distance on the basis of a predetermined criterion of the spatial position, the control can actuate the transmission unit, depending on the spatial position data from the movement sensor, in such a way that the pulses of the optical radiation are only emitted in a defined directional range about the targeted target object, i.e. especially only in the predetermined range about the central region. This type of transmitter-side selection can be advantageous, e.g. in respect of power consumption, since energy for emitting the pulses is only consumed when the signal information thereof is also in fact able to make a constructive contribution to determining the distance to the targeted target object. The time window required for determining the distance, i.e. especially the part of the distance determination in which optical signals are emitted or received, is longer in this case than an individual pulse and, in accordance with the present invention, potentially also longer than the time which would be at least required for continuous emission of the minimum number of pulses since, according to the invention, not all of the signal information which potentially can be determined is used for determining the distance—except for in the case of a sufficiently stable device hold—but only that information which also meets the criterion in respect of the respectively assigned spatial position data. Here, the assignment of the spatial position data is spatially conditional and can also take into account possible retardation times of a transmission unit, reception unit or evaluation unit or the components used therein.

However, the control can also actuate the reception unit depending on the spatial position data from the movement sensor in such a way that only portions of the optical radiation cast back from a defined directional range about the targeted target object are received. Here there is, as it were, a receiver-side selection of the pulses counting as part of the minimum number. By way of example, this can be advantageous for being able to operate the laser actuation for the pulse emission under constant conditions, for example by virtue of emission taking place with a constant pulse rate during the time window. By way of example, an amplifier, a homodyne or heterodyne mixed signal or an ADC can be controlled in the reception unit.

It is likewise possible to perform a combination of the above-described transmitter-side and receiver-side selection of the pulses which are included for determining the distance, which e.g. can further reduce the energy consumption of the distance measurement.

Alternatively or additionally, the control can actuate the evaluation unit depending on the spatial position data from the movement sensor in such a way that the distance is only determined including portions of the optical radiation cast back from a defined directional range about the targeted target object, i.e. there is, as it were, an evaluation-side selection of the pulses counting as part of the minimum number which are included for determining the distance. Here, during the time window, a memory of the evaluation unit records the signal information and the spatial position data assigned in time to emission and/or reception. The determination of the distance is performed in series or parallel using a spatial position data-dependent directional evaluation of the signal information.

When combining transmitter-side, receiver-side and evaluation-side setting of the pulses counting as the minimum number it is possible, firstly, to minimize the energy consumption of the EDM and, secondly, e.g. to determine the distance with sequencing of the inclusion of the pulses on the basis of the spatial position data assigned thereto in time. It is possible, e.g. when continuously determining or estimating the SNR achieved when determining the distance, to abort the process of determining the distance—after including the best pulses and reaching a sufficient SNR for reliable and precise determination of the distance.

In particular, the observation device can comprise a transmitted light path from an objective to an eyepiece as observation path. Specifically, this can be an unstabilized transmitted light path in this case, which provides an unstabilized observation image in the eyepiece. If there is stabilization of the observation device provided by the observation device according to the invention, this is brought about, in particular, independently of a distance measurement according to the invention—thus, in particular, no information about image stabilization is included in the distance measurement according to the invention (or this is not required). By way of example, there can also be optical stabilization of the observation image by moving or deforming optical elements in the case of an unstabilized transmitted light path such that the basic function of a conventional transmitted light observation can be carried out even without an electrical energy supply.

Furthermore, the observation device according to the invention can be embodied with the following:

a sighting apparatus in the observation path of the observation device, by means of which a targeting direction is defined, for example crosshairs or the like.

A residual light amplifier, in particular an analog residual light amplifier which enables night observations or an observation in the case of adverse light conditions.

A superposition of display images into the observation path (or mirroring-in a display into the eyepiece), for example for displaying the measured values determined by the rangefinder, geographic information, etc.

A deflection of camera images from the observation path (or mirroring images out of the objective), for example to a daylight or low-light CMOS image sensor or to a thermal imager, for remote observation or for documentation of the observation by image or video recording.

An inclination determination unit for determining an angle of inclination in relation to the horizontal and/or vertical direction. In particular, this unit, or parts thereof, may optionally also be used as movement sensor within the scope of the present invention.

A true-north determination unit, for example on the basis of the magnetic North Pole, on the basis of the Earth's rotational vector, on the basis of constellations, etc. In particular, this unit, or parts thereof (e.g. a gyroscope from determining a rotational vector of the rotational vector of the Earth), may optionally also be used as a movement sensor within the scope of the present invention.

An angle measurement unit for determining an alignment of the observation device in relation to a fixed base in one or two directions.

A geographic coordinate determination unit, e.g. on the basis of satellites, radio beacons, constellations, etc.

The above extending additions can be fixedly installed in the observation device or be added or plugged-on in a modular manner.

Particularly in the case of the inclination determination unit, angle measurement unit and/or true-north determination unit there can likewise be a control of an acquisition of the data therefrom on the basis of the predetermined criteria which are applied to the pulses for the distance measurement.

Expressed differently, the invention relates to a distance measuring method using a portable distance measuring observation device, comprising the following steps: targeting a target object with an observation path, in particular an optical transmitted light path from an objective to an eyepiece of the observation device, and triggering a distance measurement in the direction of the targeting by manual actuation of a trigger, causing the start of the time window of the distance measurement.

The distance measurement is brought about by the following steps:

emitting a temporal sequence of pulses of amplitude-modulated optical radiation in the direction of the targeting using a transmission unit, receiving a portion of the optical radiation, which is cast back by a target object, using a photosensitive electrical component, and determining signal information of the received optical radiation using a reception unit, and determining a distance to the target object on the basis of a signal travel time between emission and reception of the optical radiation using an electronic evaluation unit.

Here, the distance is determined including the signal information from a specified minimum number of pulses, which minimum number defines a minimum length of a time window of the distance measurement. Here, an instability of a spatial position of the observation device is acquired using a movement sensor and, by using an actuation unit, the distance measurement is controlled on the basis of spatial position data from the movement sensor in such a way that the pulses counting as part of the minimum number satisfy predetermined criteria in respect of these spatial position data assigned in time.

Here, the distance measuring method according to the invention can be brought about by predetermining a fixed number for the minimum number. This can be permanently programmed in the device or selectable by the user. There can also be dynamic determination of the minimum number depending on a signal quality of the reception, in which the minimum number is predetermined depending on a characteristic for the quality of the current distance measurement. By way of example, reaching a minimum SNR limit value can define the minimum number when determining the distance, that is to say the minimum number may be smaller in the case of a good SNR of the measurement than in the case of a poor SNR. It is also possible to apply a combination of a predetermined numerical value and a dynamic determination of the minimum number, e.g. a fixed lower limit and dynamic increase of the minimum number by one step width depending on a characteristic value of the measurement result.

The instability can be acquired as an oscillation acquisition in a spatial direction of the targeting, in particular as an oscillation caused by trembling movements of a hand holding the observation device. Here, the control can be brought about on the basis of a criterion, according to which, in order to include the signal information, a current oscillation value assigned thereto in time lies in a predetermined range about a central region of the oscillation. Here, the central region can be determined as a mean value of the oscillation over a defined period of time before or after a time at which the trigger is actuated.

As already described above, the control can be brought about in such a way that:

the pulses are only emitted in a defined directional range about the targeted target object, only portions of the optical radiation cast back from a defined directional range about the targeted target object are received and/or the distance is only determined including portions of the optical radiation cast back from a defined directional range about the targeted target object.

The invention also relates to a computer program product with program code, which is stored on a machine-readable medium or a computer data signal, embodied by an electromagnetic wave, for carrying out the above-described method. Here, the program code can, in particular, establish a distance to the target object and control the distance measurement on the basis of spatial position data from the movement sensor. The program code for executing different parts of the method can in this case also be distributed over several processors or microcontrollers, which, in the optoelectronic rangefinder in an observation device according to the invention, are embodied as evaluation unit and/or actuation unit or parts thereof.

BRIEF DESCRIPTION OF THE DRAWINGS

In the following, the method according to the invention and the device according to the invention are described in more detail in a purely exemplary manner on the basis of specific embodiments schematically depicted in the drawings, with further advantages of the invention also being discussed. In detail:

FIG. 3 shows a second exemplary illustration of a case of application for an observation device according to the invention;

FIG. 4 shows a first illustration of an exemplary graph of an instability of the spatial position of an observation device according to the invention;

FIG. 5 shows an illustration of an exemplary deviation of the distance measurement at the target object, caused by the instability;

FIG. 6 shows an illustration of an exemplary, simplified probability distribution of a targeting process when an observation device according to the invention is held by hand;

FIG. 9 shows an illustration of a first exemplary signal profile of an embodiment according to the invention of a distance measurement using an observation device with an unstable spatial position;

FIG. 10 shows an illustration of a second exemplary signal profile of an embodiment according to the invention of a distance measurement using an observation device with an unstable spatial position;

FIG. 11 shows an illustration of a third exemplary signal profile of an embodiment according to the invention of a distance measurement using an observation device with an unstable spatial position;

FIG. 12a shows an illustration of a block diagram of a first embodiment of a distance measurement according to the invention using an observation device with an unstable spatial position;

The illustrations in the figures merely serve for illustrative purposes and should not be considered true to scale. The illustrated signal profiles are exemplary for illustrating the invention and may deviate from curves of measured values determined in practice.

DETAILED DESCRIPTION

Figure 1:
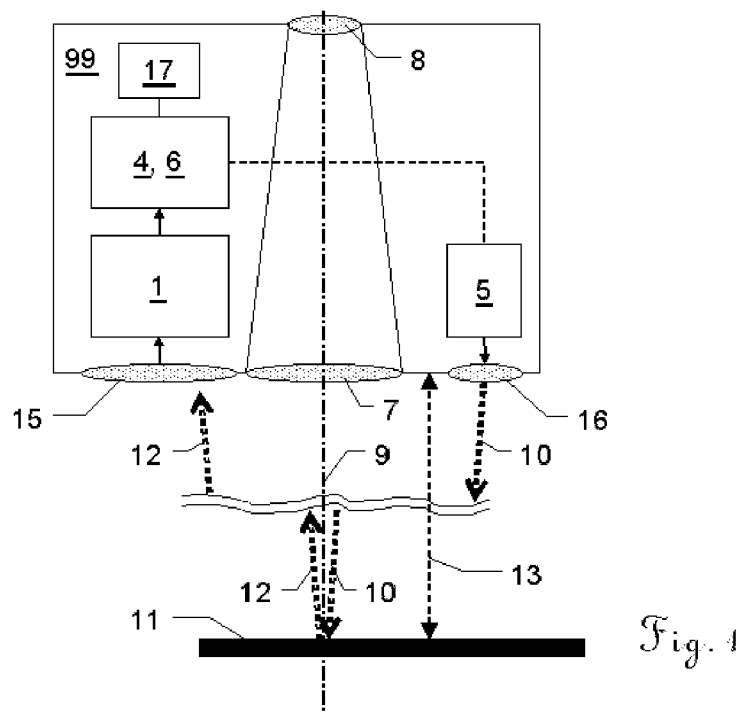
FIG. 1 shows an exemplary simplified block diagram of a first embodiment of an observation device according to the invention.

FIG. 1 shows, in a simplified block diagram, an embodiment of an observation device 99 according to the invention, comprising an optoelectronic distance meter. By way of example, this can be an observation device 99 which can be used for targeting and determining target coordinates of a target object 11 and which comprises an installed battery or rechargeable battery-operated rangefinder. In the shown embodiment, the target object 11 is observed and targeted via a transmitted light channel with an eyepiece 8 and an objective 7, the optical axis 9 of which is depicted as targeting axis of the observation. Here, the targeting axis 9 corresponds to the direction in which the distance measurement takes place. The transmitted light path may also comprise further optical elements not depicted here, such as deflection mirrors, lens elements, optical filters, surface coatings, crosshairs, prisms, coupling mirrors, decoupling mirrors, etc.

The block diagram shows a biaxial embodiment of the rangefinder, in which the emission and the reception of optical distance measuring radiation 10, 12 is brought about in each case by a dedicated transmission optical unit 16 and reception optical unit 15, both of which are separate from the objective 7 for the observation. The beam paths of the transmission and reception distance measuring radiation 10, 12 (i.e. the optical axes thereof) are usually aligned in such a way that these can be considered approximately coaxial with, or parallel to, one another or that these intersect at a predetermined distance. As indicated by the breaking lines, the target object 11 is depicted unproportionally close to the device 99 in the illustration for reasons of space. In practical observations, the target object 11 is usually at a distance of several meters to kilometers. In a different embodiment according to the invention, the beam path of the emission and/or reception of the distance measuring radiation can, at least in part, be brought about by the objective 7 for observation purposes, i.e. the distance measurement or parts thereof take place coaxially with the observation, which can be implemented, for example, by mirroring-in the transmission beam 10 in the region of the center of the observation optical unit 7 and/or mirroring-out the reception beam 12. In another embodiment, the observation path can, at least in part, have a digital embodiment, e.g. wherein the objective 7 is embodied with an electronic image recording system and/or the eyepiece 8 is embodied with an electronic display unit.

The transmission unit 5 of the distance meter or rangefinder is depicted in the right-hand half of the block 99 and the reception unit 1 is depicted in the left-hand half. The separation of the two units described here should primarily be considered functionally in this case. By way of example, parts of the two units can also be housed on e.g. a common printed circuit board. The target object 11, the range or distance 13 of which is to be determined, casts at least part of the electromagnetic radiation 10 emitted by the transmission unit 5 back to the reception unit 1 as reception radiation 12. Here, part of the emitted radiation can optionally also be guided as reference beam over a reference path (not depicted here) with a known length to the reception unit 1 or to a dedicated reference receiver. The shown block diagram of the internal design of the rangefinder primarily serves for explaining the functionality and can also be varied in practical embodiments.

In one embodiment, the transmission unit 5 comprises e.g. a driver stage, which provides electrical signals for actuating a light-emitting component 6 for generating the electromagnetic radiation 10. By way of example, semiconductor light sources such as semiconductor lasers or light-emitting diodes (LEDs), semiconductor-pumped lasers or else other light sources can be used as light emitter 6. The emitted light is collimated to form a directed beam 10 with little divergence in an optical unit 16, which beam is emitted in the direction of the targeting 9. Here, the driver stage is adapted to the emission characteristics of the light source in order to generate the intensity-modulated optical transmission radiation 10, which is emitted in the form of optical pulses. Here, in addition to the emission time, it is also possible by means of the evaluation unit 4 to predetermine the intensity and pulse duration of the emitted light signals 10, for example in a plurality of discrete steps or else in a continuously variable manner.

In the shown embodiment, the evaluation unit 4 can be considered part of both the transmission unit and the reception unit and controls the sequences for determining the distance. By way of example, the evaluation unit 4 can comprise one or more appropriately programmed digital computers, such as a microprocessor, DSP, FPGA, ASIC, etc. Since the observation device is designed to be held by hand, the power supply of the distance meter or rangefinder may be provided by batteries, rechargeable batteries or other device-internal or external electrical energy sources.

The reception unit 1 converts received electromagnetic radiation 12, cast back by the target object 11, into an electrical signal by means of a reception element. The receiver of the optical radiation 12 can use a photodiode, for example a PIN photodiode or avalanche photodiode (APD) with a corresponding bias, as a reception element. The resultant electrical signal is subsequently still conditioned appropriately for the further processing, for example by impedance converting, filtering, amplifying, bandwidth limiting, heterodyne or homodyne mixing, analog/digital converting, etc.

Thereupon, the signal information from the received signal is processed by the evaluation unit 4 in order to determine the distance on the basis of the travel time of a plurality of optical pulses which were emitted and cast back by the target object. By accumulating the signal information from a plurality of pulses, the signal-to-noise ratio (SNR) can be improved in the process, in particular since uncorrelating noise terms cancel one another and the correlated distance information sums up.

Thus, the shown, portable observation device 99 comprising an optical transmitted light path from an objective 7 to an eyepiece 8 for optical targeting of a target object 11 in a targeting direction 9 comprises an optoelectronic rangefinder for measuring the distance in the direction 9 of the targeting. The rangefinder comprises a transmission unit 5 for emitting a temporal sequence of pulses of optical radiation 10, in particular in the form of a collimated laser target axis, and a reception unit 1 for receiving a portion 12 of the optical radiation 10 cast back by the target object 11. Therefore, the distance 13 to the target object 11 can be determined by the electronic evaluation unit 4 of the rangefinder 99 on the basis of a signal travel time between emission and reception of the optical radiation 10 and 12. Here, the distance 13 is determined including a plurality of pulses which define a time window of the distance measurement. Here, a start of the time window of the distance measurement is caused dependent on an actuation of a trigger of the observation device.

Furthermore, the observation device comprises a movement sensor 17, in particular an inertial measuring unit, specifically in the form of one or more accelerometers and/or gyroscopes, for registering an instability of a spatial position of the observation device 99 in the form of spatial position data. An actuation unit 6 of the rangefinder, which can also be combined with the evaluation unit, is embodied here in such a way that, in the case of the distance measurement during the time window, signal information from a plurality of pulses is only included where spatial position data, assigned to the pulses in time, of the observation device 99 correspond to predetermined criteria.

By way of example, the movement sensor 17 can also be used for further functions of the observation device, such as e.g. a determination of the targeting direction. Here, the spatial position data of the movement sensor or sensors 17 are such that a deviation in the targeting direction 9 can be determined therefrom.

Expressed differently, a multi-pulse measurement according to the invention without a measuring pulse selection according to the invention would lead to a distance measurement in the form of a point cloud in a region of or around the target object due to the instabilities in the spatial position, or lead to determining the distance to a mean value of such a point cloud. However, this would lead to a deterioration of the measurement results or to imprecise or incorrect measurements and not to the improvement of the signal-to-noise ratio sought-after by using the multi-pulse measurement—i.e. it would not obtain the desired effect or even be counterproductive. This effect occurs increasingly with increasing distances, and so problems in this respect are more pronounced when using generic portable observation devices 99 with the large distances of more than one hundred meters or more conventionally occurring in this case than when using e.g. portable rangefinders for measuring interior spaces at distances of less than one hundred meters.

Figure 2:
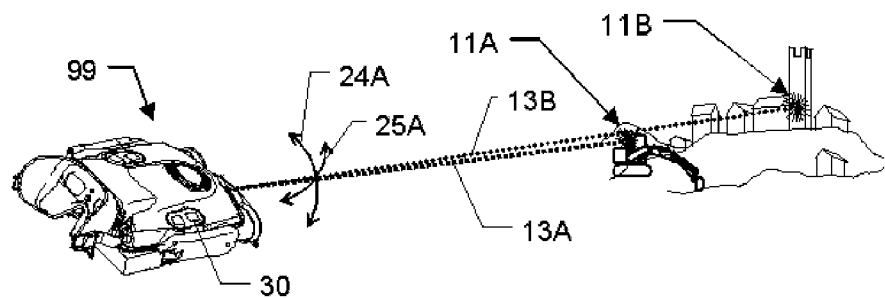
FIG. 2 shows a first exemplary illustration of a case of application for an observation device according to the invention.

FIG. 2 shows an exemplary use for an observation device 99 according to the invention, comprising a rangefinder (EDM) which is used for targeting a target object 11A and for determining the distance 13A thereof from the observer. Here, the observation device 99 has an observation direction which corresponds to the measurement direction of the distance measurement such that the rangefinder can be used to establish a distance to a target point 11A sighted during the observation.

Here, the shown observation device 99 should be used to establish the distance 13A to the vehicle 11A as target object by emitting light pulses and determining the travel time thereof. To this end, the user holds the observation device 99 and uses the generally magnifying transmitted light channel thereof to target the target object 11A and actuates the trigger 30 in order to trigger a distance measurement. This opens a time window of the measurement. During the time window, signal information from a plurality of pulse components cast back by the target object are accumulated in order to establish the distance therefrom. By way of example, the end of the time window can be defined by reaching a predetermined minimum number of pulses to be accumulated or by reaching a minimum number of pulses at which a sufficient SNR threshold of the accumulated information is obtained or on the basis of a predetermined temporal measurement duration. The determined distance information is thereupon provided to the user or a data processing unit for further processing. Here, in addition to specifying the determined distance in a display, there can also be a graphical or numerical specification of the spatial position accuracy assigned to the distance measurement, for example also together with an accuracy estimate for the distance. By way of example, this can be brought about numerically or graphically.

The restricted stability of holding the device in the case of handheld observation devices with distance measuring functionality restricts the distance measurement accuracy range considered to be expedient. There is little point in a distance measurement with millimeter accuracy using a hand-held observation device, in particular in the case of measurement distances in the range of several hundred meters or a few kilometers. A magnified observation and measurement of faraway targets is a common object which is to be achieved by such handheld devices. In the fields of application of the generic observation devices 99, a large measurement range, which enables observation and measurement from a relatively large distance from a danger zone, is to be preferred over a highly precise measurement. Examples for this can be e.g. hunting uses, military or police operations, landmark navigation by pedestrians, land vehicles, aircraft or water vehicles, etc.

However, the correct targeting of the target object 11A and the reliable measurement thereof is of importance. As a result of the instability 24A, 25A of holding the device, the targeting does not always point on the target object 11A during the time window. Particularly in the case of relatively large target distances, angle deviations 24, 25 of the order of only a few arc seconds when holding the device by all means cause a deviation, of the order of meters, of the targeted point on the target. By way of example, in the shown figure, this means that the measurement direction does not point in the direction 13A of the desired target object 11A, but rather in the direction 13B of the undesired target 11B. However, components cast back by the undesired target 11B do not contribute to measuring the target object 11A, but rather falsify the measurement, make it ambiguous or increase the uncertainty, reduce the SNR or make determining a distance by the evaluation unit completely impossible. It may even be the case that the observation device outputs to the user the distance 13B to the object 10B even though the user targeted the target object 11A in good faith and accordingly assumes to be measuring this distance. Particularly if such an error can be traced back to a chance inexpedient correlation of the pulse emission with the instability, such an error may not be apparent to the user in any way.

FIG. 3 shows a further, exemplary illustration for measuring a target object 11 using an observation device 99 in the form of binoculars, which the user holds in the hand 98 in order, by looking into the eyepieces 8, to target the target object 11 for determining the distance. In the illustration, the optical radiation is emitted and received through one of the objectives 7; thus, this is a coaxial measurement in which the optical emission and/or reception radiation is coupled into the transmitted light channel in the device or decoupled therefrom. The objective 7 of the observation channel thus constitutes part of the transmission optical unit 16 and/or reception optical unit 15 of the rangefinder.

The tremor of the hand 98 which is invariantly present causes angular movements 24A, 25A in the process, which let the direction 10A of the desired targeting for example sway in directions 10B, direction 10C or in any another direction. Thus, different points 14 would be measured on the target object in the prior art, or the determined distance value would be determined as a type of averaging of the travel time information to the different target points 14. When accumulating the signal information, the different targeting could cause e.g. a broadening of the reflection pulse shape in the signal used for determining the distance, which, instead of the lower SNR of the sought-after ideal case of the multi-pulse measurement, can cause a larger width of the measurement uncertainty range and, possibly, also ambiguities in the determined distance. This is the case, even though the user actuates the trigger 30 when, in the view of said user, there is exact targeting of the desired target point 14.

FIG. 4 shows an exemplary movement of the uncertainty of the targeting, as is registered by a movement sensor in the observation device when held by hand.

In general, the movement is expressed as an oscillation about the desired targeting, which is situated in a central region of the oscillation. Here, this oscillation is generally irregular but, in terms of its fundamental oscillation, can be traced back or decomposed to a great extent to one or a few approximately sinusoidal curves. However, in this case there are, by all means, outliers of the movement curves from this approximation. Preferably, the oscillations are registered along at least two axes by the movement sensor, wherein these axes can be combined in a deviation vector or the magnitude of this vector.

For reasons of clarity, the amplitude profile of the oscillations is depicted here in a very simplified manner as a pure sinusoidal oscillation, which corresponds to a first approximation but should not be considered restrictive. In a simplified manner, the oscillation of the instability should be considered a changing component of the movement sensor which usually occurs within a certain frequency band; however, it is also possible to take into account a very low-frequency component or a constant portion of the movement sensor data, for example to detect a complete drifting from the target object during the time window and to abort the measurement in this case since no valid measurement result is to be expected anyway.

FIG. 5 shows the position 14 of the measurement point of the distance measurement on the target object 11 or the angle deviation by the instability in a coordinate system 24A, 25A. In a simplified manner, the movements along the two axes 24A, 25A are depicted as approximately equal, as a result of which the incidence probability limits of the probability curve 20 can be depicted in a simplified manner as circles 26, 27, 28. Here, circles are depicted for in each case 99% (28), 66% (27) and 33% (26) of the directions. The center constitutes the actual desired targeting direction 2, in which the targeting would take place in the stable ideal case. The depicted probability distribution corresponds to the distribution of the pulse incidence points 14 if these were to be emitted continuously or periodically over the time window.

In order to explain the principle according to the invention, according to which the pulses counting as part of the minimum number meet predetermined criteria in respect of these spatial position data (24, 25 or 24A, 25A) assigned in time, the filled region 29 within the circle 27 is depicted in an exemplary manner as such a criterion in the coordinate system. Thus, the criterion in this example is satisfied if the magnitude of a vector of the spatial position data lies below a threshold. Signal information with spatial position data outside of this criterion no longer count as part of the minimum number and there is no determination of the distance using information from possible pulses assigned thereto in time.

FIG. 6 shows another criterion in a two-dimensional display relating to the deviations 24 or 25 separately or a vector made of both. From a statistical point of view, the instability can be described, at least approximately, with an approximately normal distribution around the targeting. Here, it is possible to use e.g. standard deviation (or the variance) of the movement as a corridor for the inclusion of individual measurements in determining the distance. In the illustration, the criterion 29 is formed on the basis of a statistical characteristic of the intensity distribution 20 about the desired targeting 2, for example that, as a criterion for inclusion, the instability must lie in a region of the standard deviation of two sigma, wherein this value should be seen as purely exemplary. It is also possible to use a different statistical parameter than the standard deviation.

Figure 7:
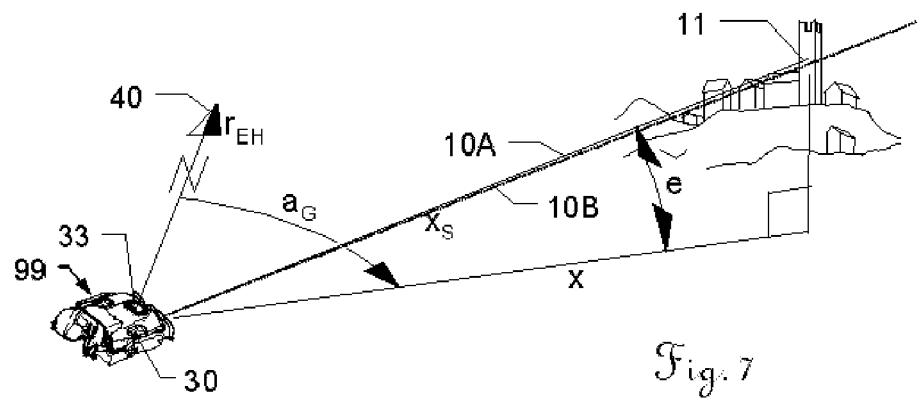
FIG. 7 shows a third exemplary illustration of a case of application for an observation device according to the invention.

FIG. 7 shows an embodiment of an observation device according to the invention, which is used for landmark navigation. By way of example, an inclination e of the measurement direction with respect to the horizontal direction can, to this end, be determined by means of inclination sensors in the observation device, as a result of which, for example, it is possible to determine a horizontal projection x of the distance Xs determined by the EDM. It is also possible, for example by means of a compass in the observation device, to determine a vertical angle measurement and hence an azimuth measurement direction Ag. Therefore, the device can be used e.g. for simple navigation on the basis of mapped landmarks.

If coordinates of the observation location are known, for example if the device or the location of the device is globally referenced with average accuracy by means of a GPS 33, it is also possible to determine geographic coordinates of the target object 11 on the basis of the distance and alignment data.

Here, the accuracy that can be obtained using a hand-held device, the angle alignment of which is e.g. determined by means of an inclination sensor and/or a compass, is restricted in any case in the aforementioned cases, and so stabilization of the whole observation device would only entail minor improvements. However, reliable targeting, which is possible according to the invention, in view of the correct acquisition of the distance to the target object 11 is of importance in such measurement objects. In the shown figure, a small deviation from the targeting 10A would mean a targeting missing the target object 11, as depicted by the dotted line 10B, making a measurement impossible or reducing the SNR of the measurement as a result of the instability and the result would be less accurate and/or less reliable.

Figure 8:
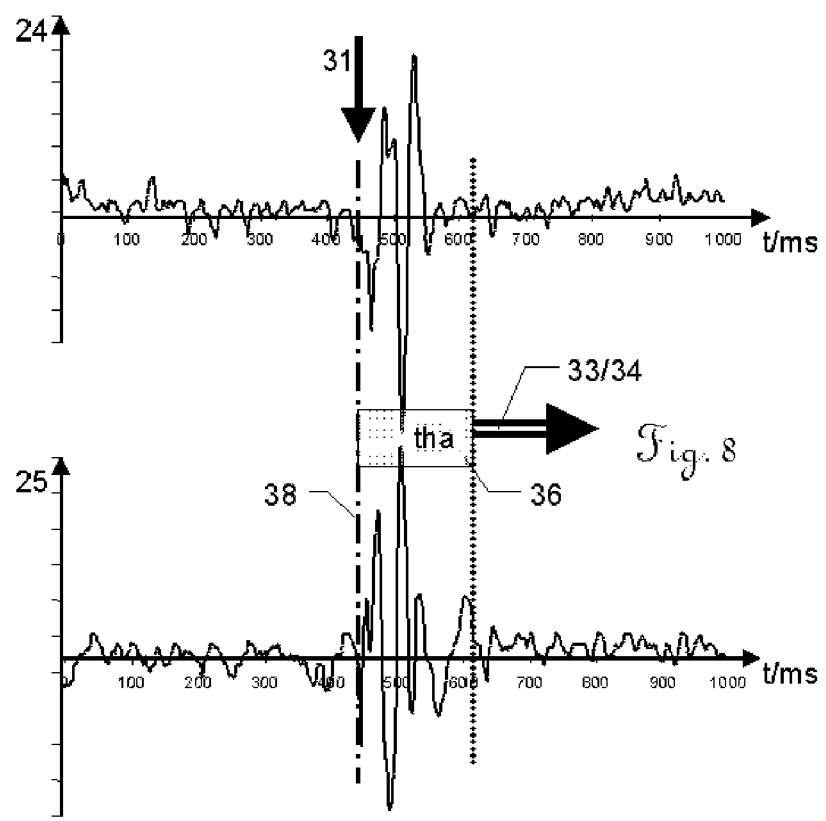
FIG. 8 shows a second illustration of an exemplary graph of an instability of the spatial position of an observation device according to the invention.

FIG. 8 shows an example of a tremor curve of a device being held by hand, recorded using a two-axis accelerometer. Pressing a triggering button 30 at the time 38, symbolized by an arrow 31, is clearly visible in the profile of the oscillation curves 24, 25 as peak values caused thereby. In a special embodiment, such triggering-dependent wobbling can be masked e.g. by the depicted dead time 36 (tha) after triggering, during which there is no measurement. Here, the duration of the dead time can be determined e.g. as a function of a movement amplitude value or as a defined time.

FIG. 9 shows an embodiment of the invention, in which, using a dashed line, exemplary spatial position data from the movement sensor 17 are depicted as a graph 24, 25 over time. Here, the line can depict single axis or correspondingly combined multi-axis spatial position data, which are symbolized by the two reference signs 24, 25 separated by a comma. The trigger 30 is actuated at a time 38 marked by an arrow 31. In this example, the instabilities are already registered before this time 38 and the targeting direction 2 (depicted here as relative reference in the form of the time axis) is determined on the basis of a range 39 between the smoothed peak values 32, shown here by dots, of the spatial position data 24, 25. Furthermore, a range 33 is also defined, in which the criterion counts as met, e.g. as a percentage value of the range 39. Alternatively, the size of the range 33 can also be predetermined as a fixed value in units of the spatial position data 24, 25, for example by virtue of a setting in the form of a selection between "large target object" and "small target object" being provided in the observation device. Since the manual actuation of the trigger 30—as can be seen on the basis of the graphs 24, 25—causes a particularly high instability, a pre-time interval 35 directly before and a post time interval 36 directly after the actuation 31 is not included in this embodiment in a manner developed further. However, according to the invention this is not mandatory. If the strong triggering oscillation has decayed after the time 36, the distance measuring time window is subsequently opened and if the spatial position data 24, 25 meet the criterion in the range 33 (the width of which in this case—as indicated by the arrow—is adopted from the targeting prior to triggering), the pulse information assigned in time are included for the distance measurement by virtue of measurement pulses 37 then also in actual fact being emitted by the transmission unit of the rangefinder, which is depicted in the upper sub-graph. The portions 34 of the range 33 meeting this criterion are correspondingly depicted in a darker shade. Therefore signal information from pulses only count if the assigned spatial position data 24, 25 meet the criterion for the minimum number of pulses on the basis of which the distance is determined. The minimum number to be reached can in this case e.g. be predetermined as a numerical value or else be determined as explained within the scope of the preceding embodiment. Instead of controlling the emission on the basis of the criterion, it is also possible to apply a principle as explained below in relation to FIG. 12*a*, FIG. 12*b*, and FIG. 12*c*.

FIG. 10 shows another exemplary embodiment with a similar design as in FIG. 9. In contrast to above, the targeting direction 2 and the criterion are in this case only determined after the triggering 31 and the optional wait for a dead time 36 (tha). The targeting direction 2 can be determined as current spatial position data value 24, 25 at the time 38 of the triggering, but in view of the instabilities it is practical to apply a temporal mean value, median, RMS, statistical characteristic, etc. of the spatial position data in order to determine this targeting direction 2.

Here—as indicated in the lower sub-graph—the SNR 39 of the accumulated signal information from the pulses increases with each emitted pulse 37. If the SNR 39 has reached a threshold sufficient for determining the distance, the required minimum number of pulses has been reached and the time window twd can be closed since the distance can now be determined in a reliable manner. This is illustrated by the pulses 37 depicted with dashed lines, which are no longer even emitted, received and/or evaluated. Instead of controlling the emission on the basis of the criterion, it is also possible to apply a principle as explained below in relation to FIG. 12*a*, FIG. 12*b* and FIG. 12*c* or a combination thereof. As an alternative—as already explained—it is possible to predetermine the minimum number as a numerical value or to apply a combination of these two minimum number conditions, in the case of which, for example, the condition which is satisfied first becomes effective.

FIG. 11 shows a further embodiment with similar graphs as above in FIG. 9 or FIG. 10; however, in this case, the criterion is determined dynamically. As shown here in an exemplary manner, an enveloping curve 32 of the spatial position data can at least approximately be determined in the process, as a function of which a range 33 of the criterion is determined. As a result of this, pulse information from the intervals 34 marked in a dark manner count as part of the minimum number, on the basis of which the distance is determined. Using this, the time window of the distance measurement is defined, which time window is closed after reaching the minimum number in particular. In this embodiment, the time window here is started directly with the triggering 31.

By way of example, the explained embodiments can be provided as automatic or user-selectable options, wherein e.g. a percentage or effective value of the range size 33 of the criterion, or else a more user-intuitive selection such as large/small target object or narrow/wide target direction tolerance, can be directly predeterminable.

In addition to the primary control of the distance measurement according to the invention, based on the spatial position data, it is also possible to control, with the same dependence on the spatial position data determined by the movement sensor, a direction and/or inclination measurement or a different measured value acquisition of the observation device. The temporal acquisition or temporal averaging of these measured values can therefore likewise take place during the time window and, optionally, also only if the criterion is satisfied.

FIG. 12*a* shows a block diagram of an embodiment of the invention. The components are depicted as blocks and the signal paths between these are depicted as connections. The ovals in each case depict examples for associated signal shapes.

In this embodiment, pulses, which would not count as part of the minimum number due to non-satisfaction of the criterion, are not even emitted by virtue of the transmission unit 5 being controlled in a spatial position data-dependent manner. Here, the movement sensor 17 provides the spatial position data 24, 25. On the basis of the spatial position data, the control unit 6 determines the time intervals 34 in which the criterion is satisfied, especially on the basis of an amplitude value of the spatial position data. Here, it is also possible to take into account possible dead times of the components and units of the rangefinder. In this embodiment, the transmission unit is subsequently only prompted to emit a pulse if the criterion is satisfied, i.e. in the time intervals 34. The pulses 37 emitted by the transmission unit 5 are at least in part cast back by the target object 11 and are acquired by the reception unit 1 as reception pulses 47. Here, the acquisition can be continuous (as shown with the interval 44) or only if the criterion is satisfied (i.e. during the intervals 34). Here the latter can further reduce the noise component of the accumulated information evaluated for determining the distance and can further reduce the energy consumption.

The evaluation unit 4 then determines a distance on the basis of the minimum number of pulses. Since the pulses are only emitted when the criterion is satisfied, the signal information from all received pulses can be included in the distance measurement in this case. However, for example, there can also additionally be further selection of the included information on the basis of the spatial position data assigned thereto by virtue of the best pulses—that is to say those with the spatial position data closest to the ideal targeting direction—being included in a preferred manner, that is to say e.g. with a correspondingly higher evaluation. The signal information can also be ordered in accordance with the associated spatial position data and the determination of the distance can be aborted in the case of a sufficient SNR.

The process described above is started dependent on the actuation 31 of the trigger 30, wherein the time window of the measurement is opened directly thereafter or after a defined waiting time. Once the minimum number has been reached, this time window can be closed again.

Figure 12B:
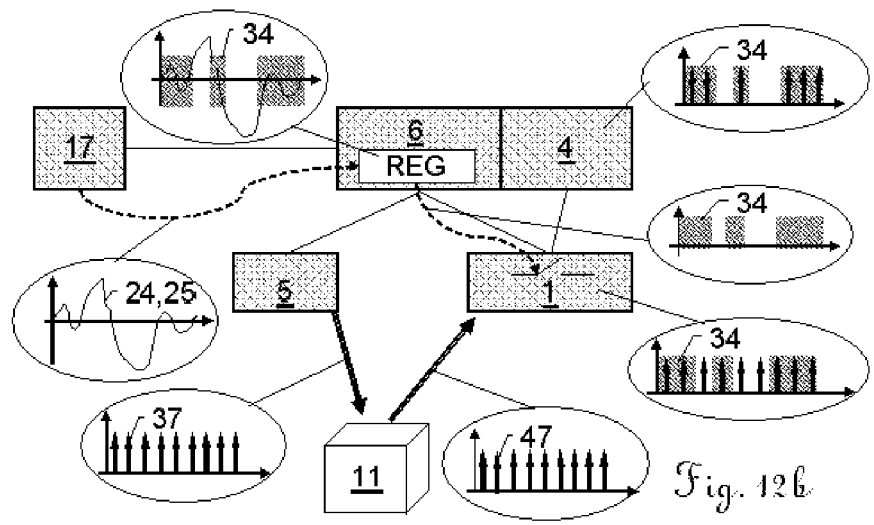
FIG. 12b shows an illustration of a block diagram of a second embodiment of a distance measurement according to the invention using an observation device with an unstable spatial position.

FIG. 12*b* shows a block diagram of another embodiment of the invention, with the same design as in FIG. 12*a*. In this embodiment, pulses which do not count as part of the minimum number due to the non-satisfaction of the criterion are not received by virtue of the reception unit 1 being controlled in a spatial position data-dependent manner.

Here, the pulses are emitted during the time window, independently of the spatial position of the observation device, and consequently also cast back, but the pulse information thereof is only in fact received and provided for the evaluation during spatial position data-dependent time intervals within the time window. Therefore, only those pulses which satisfy a corresponding criterion of the associated spatial position are part of the minimum number of the items of pulse signal information included when determining the distance.

Figure 12C:
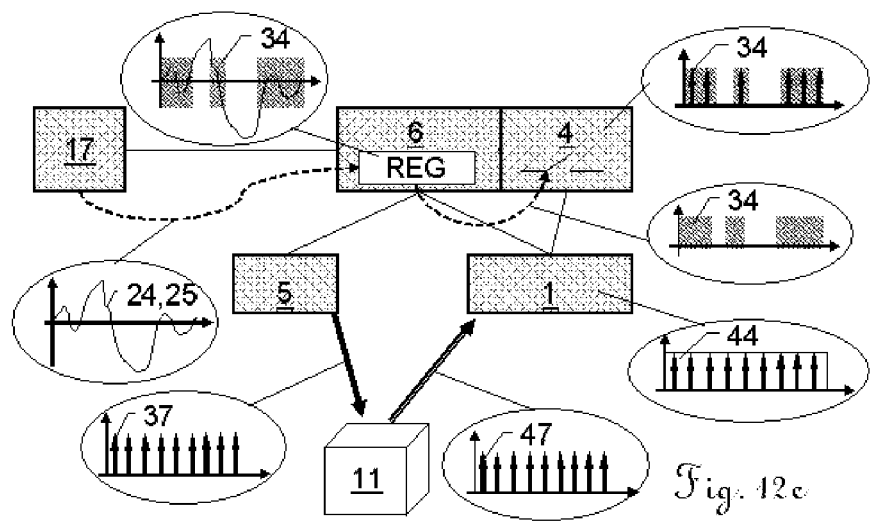
FIG. 12c shows an illustration of a block diagram of a third embodiment of a distance measurement according to the invention using an observation device with an unstable spatial position.

FIG. 12c shows a block diagram of another embodiment of the invention, with the same design as in FIG. 12a or FIG. 12b. In this embodiment, pulses which do not count as part of the minimum number due to the non-satisfaction of the criterion are not evaluated by virtue of the evaluation unit 1 being controlled in a spatial position data-dependent manner.

Here, the pulses are emitted and received during the time window, independently of the spatial position of the observation device. However, the signal information is only evaluated for those pulses whose assigned spatial position data satisfy a predetermined criterion. This evaluation may occur online or the signal information and the assigned spatial position data can be buffer stored during the time window and only evaluated after the time window is closed in order to determine which pulses count as part of the minimum number of the items of pulse signal information included when determining the distance.

The principles explained using FIG. 12a, FIG. 12b, FIG. 12c can also be combined with one another, as was, for example, already described further above.

Figure 13A:
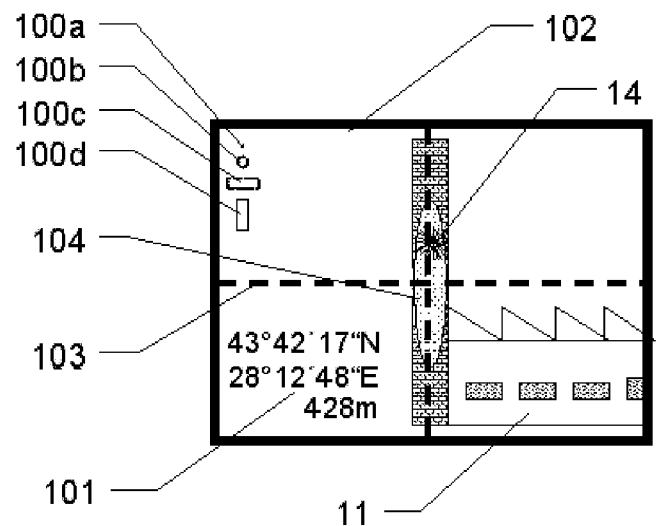
FIG. 13a shows an illustration of an example of a first observation image from an embodiment of an observation device using a distance measurement according to the invention.

FIG. 13a shows an example of a first observation image 102 of an exemplary embodiment of an implementation of the invention. The observation image 102 presented to the user shows a building 11 as observed target object, which is targeted with the crosshairs 103 in order to be measured by the rangefinder. In this example, the measured values are superposed in the form of geographic target coordinates in the display field 101, which coordinates were determined e.g. from the determined distance, taking into account GNNS receiver data and the horizontal and vertical alignment of the target axis. Here, it is possible to select between different validity regions, in this example e.g. "small validity region" 100a, "large validity region" 100b, "horizontal validity region" 100c or "vertical validity region" 100d. In accordance with the vertical target shape of the targeted tower of the building 11, the vertical validity region 100d is selected in this case, which e.g. may correspond to a region 104 depicted by an ellipse, which region 104 can optionally also be displayed in the observation image. In addition to an ellipse 104, the region 104 may, however, also have different shapes, e.g. rectangular, round, etc. According to the invention, pulses are in this case not counted as part of the minimum number if these do not meet the criterion—lying within the selected region 104 (or 100d)—determined on the basis of the movement sensor. The distance measurement point 14 shown in an exemplary manner, which deviates from the crosshairs target axis due to holding instabilities, would thus be included even if it deviates significantly from the target axis in the vertical direction.

Figure 13B:
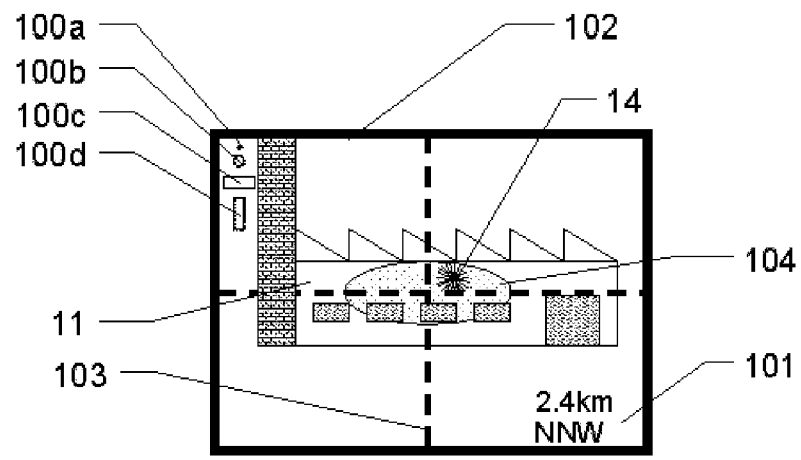
FIG. 13b shows an illustration of an example of a second observation image from an embodiment of an observation device using a distance measurement according to the invention.

FIG. 13b shows an example of a second observation image 102 of an exemplary embodiment of the invention, with a similar design as in FIG. 13a. In this example, a vertically extending building complex of the target object 11 is targeted by the crosshairs 103 and the region 100c is selected accordingly. In this example, the determined distance is displayed together with a compass alignment in the field 101. In addition to fixedly predetermined regions 100a, 100b, 100c, 100d, the regions or criterion limits can also be designed to be adaptable by the user in terms of the size and/or shape thereof, for example by virtue of the horizontal and/or vertical region boundaries or a diameter limit of the region being continuously or discontinuously displaceable by means of a user interface, for example by virtue of the two foci of the depicted ellipse being variable in each case. However, in other embodiments, it is also possible to completely dispense with a selectability and/or display of the criterion.

What is claimed is:

1. A portable observation device comprising an observation path for optical targeting of a target object, and comprising an optoelectronic rangefinder for measuring the distance in the direction of the targeting comprising:
a transmission unit for emitting a temporal sequence of pulses of optical radiation, a reception unit for receiving a portion of the optical radiation cast back by the target object and for determining signal information of the cast-back portion of an emitted pulse, and an electronic evaluation unit, which is embodied in such a way that a distance to the target object can be determined on the basis of a signal travel time between emission and reception of the optical radiation, wherein the distance is determined including the signal information from a specified minimum number of pulses, which minimum number defines a minimum length of a time window of the distance measurement, and comprising a trigger which can be actuated manually and the actuation of which causes a start of the time window of the distance measurement, wherein the observation device comprises a movement sensor for acquiring an instability of a spatial position of the observation device and an actuation unit of the rangefinder, which is embodied in such a way that the rangefinder is controlled on the basis of spatial position data from the movement sensor in such a way that the pulses counting as part of the specified minimum number of pulses satisfy predetermined criteria in respect of temporally assigned spatial position data of the specified minimum number of pulses, wherein the actuation unit actuates the transmission unit, depending on the spatial position data from the movement sensor, in such a way that the pulses of the optical radiation are only emitted in a defined directional range about the targeted target object.

2. The observation device according to claim 1, wherein the specified minimum number of pulses is predetermined as a fixed number or else determined dynamically depending on a signal quality of the reception.

3. The observation device according to claim 1, wherein the instability is acquired in the form of an oscillation in a spatial direction of the targeting, and control is brought about on the basis of a criterion, according to which, in order to include the signal information, a current oscillation value assigned thereto in time lies in a predetermined range about a central region of the oscillation.

4. The observation device according to claim 3, wherein the central region of the oscillation is a mean value of the movement over a defined period of time before or after a time at which the trigger is actuated.

5. The observation device according to claim 3 or 4, wherein the predetermined range about the central region of the oscillation is set with dynamic or statistical dependence on an amplitude of the oscillation as a percentage, which can be set by the user, of a maximum value of the amplitude or as a percentage of a standard deviation of the amplitude of the oscillation.

6. The observation device according to claim 3, wherein the predetermined range is set as a percentage, which can be set by the user, of a maximum value of the amplitude or as a percentage of a standard deviation of the amplitude of the oscillation.

7. The observation device according to claim 1, wherein the actuation unit actuates the reception unit depending on the spatial position data from the movement sensor in such a way that only portions of the optical radiation cast back from a defined directional range about the targeted target object are received.

8. The observation device according to claim 1, wherein the actuation unit actuates the evaluation unit depending on the spatial position data from the movement sensor in such a way that the distance is only established including portions of the optical radiation cast back from a defined directional range about the targeted target object.

9. The observation device according to claim 1, wherein the observation path is configured as an optical transmitted light path from an objective to an eyepiece.

10. The observation device according to claim 1, wherein the observation device is embodied with a sighting apparatus in the observation path of the observation device, by means of which a targeting direction is defined, a residual light amplifier, a superposition of display images into the observation path, a deflection of camera images from the observation path, an angle measurement unit, a true-north determination unit, an inclination determination unit and/or a geographic coordinate determination unit (GPS), wherein an acquisition of data from at least one of the aforementioned units on the basis of the predetermined criteria is controlled.

11. The portable observation device according to claim 1, wherein the observation path is unstabilized and the observation device provides an unstabilized observation image.

12. The portable observation device according to claim 1, wherein the optoelectronic rangefinder is a laser distance meter with a collimated laser beam as a target axis.

13. The portable observation device according to claim 1, wherein the observation device provides an unstabilized observation image in the eyepiece.

14. The portable observation device according to claim 1, wherein during the time window, a memory of the evaluation unit records the signal information and the spatial position data assigned in time to emission and/or reception and the determining process is performed using a spatial position data-dependent directional evaluation of the signal information.

15. A distance measuring method using a portable distance measuring observation device, comprising the following steps:
targeting a target object with an observation path, triggering a distance measurement in the direction of the targeting by manual actuation of a trigger, causing the start of the time window of the distance measurement, emitting a temporal sequence of pulses of amplitude-modulated optical radiation in the direction of the targeting using a transmission unit, receiving a portion of the optical radiation, which is cast back by a target object, using a photosensitive electrical component, and determining signal information of the received optical radiation using a reception unit, determining a distance to the target object on the basis of a signal travel time between emission and reception of the optical radiation using an electronic evaluation unit, wherein the distance is determined including the signal information from a specified minimum number of pulses, which minimum number defines a minimum length of a time window of the distance measurement, wherein acquiring an instability of a spatial position of the observation device using a movement sensor and, by using an actuation unit, controlling the distance measurement on the basis of spatial position data from the movement sensor in such a way that the pulses counting as part of the specified minimum number of pulses satisfy predetermined criteria in respect of temporally assigned spatial position data of the specified minimum number of pulses, wherein the pulses are only emitted in a defined directional range about the targeted target object.

16. The distance measuring method according to claim 15, wherein predetermining a fixed number for the minimum number, or dynamically determining the minimum number depending on a signal quality of the reception wherein reaching a minimum signal-to-noise ratio limit value defines the minimum number when determining the distance.

17. The distance measuring method according to claim 15, wherein the instability is acquired as an oscillation in a spatial direction of the targeting, and the control is brought about on the basis of a criterion, according to which, in order to include the signal information, a current oscillation value assigned thereto in time lies in a predetermined range about a central region of the oscillation.

18. The distance measuring method according to claim 17, wherein the central region is determined as a mean value of the oscillation over a defined period of time before or after a time at which the trigger is actuated.

19. The distance measuring method according to claim 15, wherein the control is brought about in such a way that in addition to the emission, only portions of the optical radiation cast back from a defined directional range about the targeted target object are received and/or the distance is only determined including portions of the optical radiation cast back from a defined directional range about the targeted target object.

20. A computer program product with program code, which is stored on a non-transitory machine-readable medium for carrying out the method according to claim 15, wherein the program code determines a distance to the target object and controls the pulse emission of the distance measurement on the basis of spatial position data from the movement sensor, when the program code is executed in a control unit of an optoelectronic rangefinder in an observation device.

* * * * *